(12) United States Patent
Leidner et al.

(10) Patent No.: US 11,132,748 B2
(45) Date of Patent: Sep. 28, 2021

(54) METHOD AND APPARATUS FOR RISK MINING

(75) Inventors: Jochen Lothar Leidner, Eagan, MN (US); Frank Schilder, St. Paul, MN (US)

(73) Assignee: Refinitiv US Organization LLC, New York, NY (US)

( * ) Notice: Subject to any disclaimer, the term of this patent is extended or adjusted under 35 U.S.C. 154(b) by 227 days.

(21) Appl. No.: 12/628,426

(22) Filed: Dec. 1, 2009

(65) Prior Publication Data

US 2011/0131076 A1 Jun. 2, 2011

(51) Int. Cl.
*G06Q 40/08* (2012.01)
*G06Q 10/06* (2012.01)

(52) U.S. Cl.
CPC ......... *G06Q 40/08* (2013.01); *G06Q 10/0635* (2013.01)

(58) Field of Classification Search
CPC .................................................. G06Q 10/0635
USPC ................................................ 705/7.11–7.42
See application file for complete search history.

(56) References Cited

U.S. PATENT DOCUMENTS

| | | | | |
|---|---|---|---|---|
| 6,876,992 B1* | 4/2005 | Sullivan | ......................... | 706/47 |
| 7,003,517 B1* | 2/2006 | Seibel et al. | | |
| 8,041,632 B1* | 10/2011 | Coleman | ......................... | 705/38 |
| 8,180,713 B1* | 5/2012 | Rigby et al. | ................... | 706/12 |
| 2003/0050927 A1* | 3/2003 | Hussam | ............. | 707/5 |
| 2004/0093331 A1* | 5/2004 | Garner et al. | ................... | 707/3 |
| 2005/0044037 A1 | 2/2005 | Lawrence et al. | | |
| 2005/0071217 A1* | 3/2005 | Hoogs et al. | ................... | 705/10 |
| 2005/0197952 A1* | 9/2005 | Shea et al. | ....................... | 705/38 |
| 2006/0004878 A1* | 1/2006 | Lawrence et al. | ............ | 707/200 |
| 2006/0129427 A1* | 6/2006 | Wennberg | ......................... | 705/2 |
| 2006/0206941 A1 | 9/2006 | Collins | | |
| 2008/0086387 A1* | 4/2008 | O'Rourke et al. | ............ | 705/27 |
| 2009/0055242 A1* | 2/2009 | Rewari | .................. | G06Q 30/02 705/7.34 |
| 2009/0144070 A1* | 6/2009 | Psota et al. | ...................... | 705/1 |
| 2009/0234718 A1* | 9/2009 | Green | ............................. | 705/10 |

(Continued)

FOREIGN PATENT DOCUMENTS

WO    2006036152 A1    4/2006

OTHER PUBLICATIONS

Chin et al, Automatic Discovery of Concepts from Text, 2006 (Year: 2006).*

(Continued)

*Primary Examiner* — Mohamed N El-Bathy

(57) ABSTRACT

A computer implemented method for mining risks includes providing a set of risk-indicating patterns on a computing device; querying a corpus using the computing device to identify a set of potential risks by using a risk-identification-algorithm based, at least in part, on the set of risk-indicating patterns associated with the corpus; comparing the set of potential risks with the risk-indicating patterns to obtain a set of prerequisite risks; generating a signal representative of the set of prerequisite risks; and storing the signal representative of the set of prerequisite risks in an electronic memory. A computing device or system for mining risks includes an electronic memory; and a risk-identification-algorithm based, at least in part, on the set of risk-indicating patterns associated with a corpus stored in the electronic memory.

27 Claims, 12 Drawing Sheets

(56) References Cited

U.S. PATENT DOCUMENTS

2010/0100517 A1* 4/2010 Laxman et al. .............. 706/46
2010/0198757 A1* 8/2010 Cheng et al. ................ 706/12

OTHER PUBLICATIONS

Sriharsha Veeramachaneni and Ravi Kumar Kondadadi, "Surrogate Learning—From Feature Independence to Semi-Supervised Classification", In: Proceedings of the NAACL HLT Workshop on Semi-supervised Learning for Natural Language Processing, pp. 10-18, Boulder, Colorado, Jun. 2009, Association for Computational Linguistics (ACL) (2009).

Marti A. Hearst, "WordNet: An Electronic Lexical Database and Some of its Applications: Automated Discovery of WordNet Relations", MIT Press (1998) (Christiane Fellbaum (Ed.)).

Kotsiantis, S. et al., "Efficiency of Machine Learning Techniques in Bankruptcy Prediction", 2nd International Conference on Enterprise Systems and Accounting (ICESAcc '05) Jul. 11-12, 2005, Thessaloniki, Greece, pp. 39-49.

Shin, K. et al., "An application of support vector machines in bankruptcy prediction model", Elsevier, Expert Systems with Applications 28 (2005) 127-135.

"Bankruptcy Prediction Models", BankruptcyAction.com, pp. 1-5, http://www.bankruptcyaction.com/insolart1.htm.

He Yihong et al.: "An empirical evaluation of bankruptcy prediction models for small firms: an over-the-counter market experience" Money Watch, pp. 2-15, http://findaricles.com/p/articles/mi_hb6182/is_1_9/ai_n29241532/pg_12/?tag=content;col1.

"A Model of Bankruptcy Prediction", DefaultRisk.com, pp. 1-2, http://defaultrisk.com/pp_score_20.htm.

Kloptchenko, A. et al., "Mining Textual Contents of Financial Reports", The International Journal of Digital Accounting Research, vol. 4, N. 7, 2004, pp. 1-29.

"Kalman Filter", Wikipedia, pp. 1-21, http://en.wikipedia.org/wiki/Kalman_filter.

"The Kalman Filter", pp. 1-6, http://www.cs.unc.edu/~welch/kalman/index.html.

Lu Hsin-Min et al.: "Risk Statement Recognition in News Articles", Thirtieth International Conference on Information Systems, Phoenix, Arizona 2009, pp. 1-16.

Communication from the Examining Division EP 10834996.0 dated Aug. 25, 2016.

* cited by examiner $$t_i \quad P \Rightarrow Q$$

$$t_j \quad P$$

---

$$t_k \qquad Q \qquad i<j<k$$

METHODS FOR RISK IDENTIFICATION (A.1) Regular patterns over surface strings and named entity tags (A.2) Identification of words frequently associated with "risk" (and a set of human-provided seeds) using clustering/information theory (e.g., PMI, likelihood ratio, etc.)

(A.3) Risk-indicative sentence clustering
- Extract sentences containing an organization "ORG" named entity
- Cluster sentences based on words, e.g., named entity recognition "NER", and specific features
- Features:
    risk gazetteer (e.g. one list from (A.2) per risk type)
    speculative language: future time references, (B) Alternative: variant of machine learning techniques

Fig. 6

Example 1:

Title: Cholesterol drug cuts amputation risk for diabetics

URL: http://www.reuters.com/article/healthNews/idUSTRE54K6QZ20090522

Cholesterol drug cuts amputation risk for diabetics
Thu May 21, 2009 8:48pm EDT
 By Tan Ee Lyn
 HONG KONG (Reuters) - The anti-cholesterol drug fenofibrate appears to reduce risks of amputation for diabetics by as much as 36 percent, a study has found.
 The study was published in a special edition on diabetes by The Lancet, which included another study on how rigorous monitoring and control of blood sugar reduces heart attacks.
 In the first study, researchers in Australia ran a 5-year trial involving 9,795 diabetic patients. 4,895 of them were given fenofibrate, produced by Belgian drugs maker Solvay, while the rest were given a placebo. ...

Risk: P: "Cholesterol", Q: {Holder: "diabetics", Target: "amputation risk"}, RiskType: health, polarity:+

Fig. 7

Example 2:

Title: North Korea launch may risk more than condemnation: U.S.

URL: http://www.reuters.com/article/worldNews/idUSTRE52P5CR20090326

 REUTERS

North Korea launch may risk more than condemnation: U.S.

Thu Mar 26, 2009 1:08pm EDT

WASHINGTON (Reuters) - North Korea would risk international condemnation or "worse" if it were to carry through with plans for a space launch that the United States suspects is cover for a ballistic missile program, U.S. Director of National Intelligence Dennis Blair said on Thursday.

Blair also told reporters that North Korean leader Kim Jong-Il had a solid grip on power after recovering from a suspected stroke last year and it would be unrealistic to expect anyone else in the country to be able to seize power.

(Reporting by Randall Mikkelsen; Editing by Eric Walsh)

Risk: P:"North Korea launch", Q: {Holder: "North Korea", Target: "more than condemnation: U.S."},
RiskType: political, polarity:-

Fig. 8

Example 3:

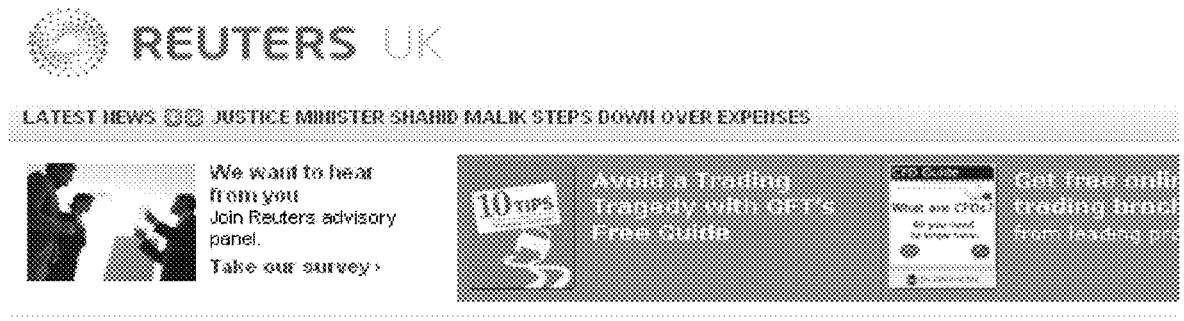

You are here: Home > News > Motoring > Article

ANALYSIS-Bolivia holds key to lithium, the battery car metal
Tue Apr 14, 2009 3:00pm BST
* Lithium demand to outstrip other battery metals
* Mining Bolivia's lithium wealth won't be easy
* Electric cars to fuel the increase in lithium By Michael Taylor LONDON, April 14 (Reuters) - Minor metal lithium is set to charge ahead to become the top material for batteries and vital for electric transport, but supplying any spike in demand could be fraught with difficulties.

Bolivia, a poor but resource-rich country governed for the past three years by leftist Evo Morales, has about 50 percent of the world's lithium deposits at about 5.4 million tonnes.

But Morales has an uneasy relationship with the United States and big business -- having already nationalized energy, mining and telecommunications companies.

"It's not open to investment," said Charles Kernot, a mining analyst at Evolution Securities. "If you can't get agreement from the Bolivian authorities, then no major mining company would be able to get in and develop the projects."

"I would be cautious ... the geology is pretty straight forward, it's just the politics of getting in to develop the asset."

Despite Morales' anti-capitalist rhetoric, some miners are already vying for control of Bolivia's mineral riches, with the amount produced currently in the country negligible.

Global lithium carbonate supply was approximately 100,000 tonnes in 2008, up 2,000 tonnes from 2007, while consumption was a little higher at 105,000 tonnes -- up 2 percent year-on-year.

"Some far-sighted companies are already attempting to secure the rights to mine lithium in Bolivia's Uyuni salt flats," said Carl Firman, an analyst at Virtual Metals, adding that the metal is mined as a by-product in clays, brines, salts or hard rock.

"This will be fraught by political complexities, as Bolivia will not simply allow its lithium to be mined and exported elsewhere for downstream processing and fabrication," he added. ...

Fig. 9

Example 4:

Definitions:
A PATTERN is an abstract representation of a set of sequences of tokens.

A FILLER is a sequence of tokens corresponding to the wild cards in a pattern.

Pattern (1): If (.+) then (.+)

Text:   If they apply military action, then the oil prices will surely go up.

This regular expression matches/describes/represents/is able to extract a sequence of word tokens beginning with "If", followed by any token sequence of length one or longer, followed by the word "then", followed by another token sequence of length one or longer. The text parts corresponding to the two parenthesis pairs ("( [...] )") is stored in registers $1 and $2, respectively.

In this examples, the fillers are
$1 = they apply military action,
$2 = the oil prices will surely go up.

Fig. 10

Example 5:

Definitions:
A PATTERN is an abstract representation of a set of sequences of tokens.

A FILLER is a sequence of tokens corresponding to the wild cards in a pattern.

Pattern (2): We/PRP expect/VBP P=* to/TO be/VB negatively/RB ? by/IN Q=* ./.

Text:   We expect oil prices to be negatively impacted by the emerging crises in the Middle East.

Fig. 11

Example 6:

Definitions:
A PATTERN is an abstract representation of a set of sequences of tokens.

A FILLER is a sequence of tokens corresponding to the wild cards in a pattern.

Pattern (3):

```
(ROOT
(S
        (NP (PRP We))
        (VP (VBP expect)
        (S
                (NP *)
                (VP (TO to)
                (VP (VB be)
                        (VP
                        (ADVP *)
                        (VBN impacted)
                        (PP (IN by)
                                (NP
                                (NP *)
                                (PP (IN in)
                                        (NP *))))))))
        (. .)))
```

Text: We expect oil prices to be negatively impacted by the emerging crises in the Middle East.

The parametric parse tree is a syntactic analysis with placeholder symbols "*" that stand for arbitrary sub-consituents of the type indicated (e.g. "(NP *)" means any noun phrase). The grammatical categories shown in the example are PENN treebank classes.

Fig. 12

Example7:

Definitions:
A PATTERN is an abstract representation of a set of sequences of tokens.

A FILLER is a sequence of tokens corresponding to the wild cards in a pattern.

Pattern (4):

nsubj(expect-2, *-1) +
    nn(*-4, *-3) +
    nsubjpass(impacted-8, *-4) +
    aux(impacted-8, to-5) +
    auxpass(impacted-8, be-6) +
    advmod(impacted-8, ?-7) +
    xcomp(expect-2, impacted-8) +
    det(*-9, *-10) +
    amod(*-10, *-11) +
    agent(impacted-8, *-12) +
    det(*-16, *-14) +
    nn(*-16, *-15) +
    (prep_in(disasters-12, *-16) || prep_in(crises-12, *-16) || prep_in(turmoil-12, *-16))

This dependency template comprises a sequence of binary grammatical dependency relationships between words. "*" represents a placeholder, i.e. any word is permissible in the structural constellation specified for the pattern to match a piece of text.

Fig. 13

METHOD AND APPARATUS FOR RISK MINING

FIELD OF THE INVENTION

This invention generally relates to the area of risk management. More specifically, this invention relates to automating risk identification using information mined from information sources.

BACKGROUND OF THE INVENTION

Organizations operate in risky environments. Competitors may threaten their markets; regulations may threaten margins and business models; customer sentiment may shift and threaten demand; and suppliers may go out of business and threaten supply. Risk management is thus a central part of operations and strategy for any prudent organization.

Currently, various risk alerts with respect to entities and activities are common. However, such risk alerts occur after the fact. While alerts as to the actual occurrence of an event which puts an entity or topic/concern at risk is important, the mining of potential risks is believed to be very useful in decision making with respect to such an entity or issue. In order to perform a meaningful risk assessment, it is often necessary to compile not only sufficient information, but information of the proper type in order to formulate a judgment as to whether the information constitutes a risk. Without the ability to access and assimilate a variety of different information sources, and particularly from a sufficient number and type of information sources, the identification, assessment and communication of potential risks is significantly hampered. Currently, gathering of risk-related information is performed manually and lacks defined criteria and processes for mining meaningful risks to provide a clear picture of the risk landscape.

One possibly related area is research on correlations between stock prices or stock price volatility (a proxy for risk) and published documents. The first step in the risk management cycle, i.e. risk identification, however, has received little or no attention. In other words, methods of the prior techniques are cumbersome, inefficient for identifying risk and lack accuracy. In particular, prior techniques require manual or operator intervention and analysis to access documents that may impact risk before alerting an analyst. Thus, the state of the art is incapable of dealing with risk unanticipated by a risk analyst.

SUMMARY OF THE INVENTION

The present invention recognizes the difficulties analysts currently have in anticipating risks and seeks to overcome these difficulties. The present invention provides a method to accurately and efficiently identify potential risks associated with various entities and activities, and includes various advantages and benefits as described further herein.

The present invention avoids the problems of the prior art by mining risk-indicating patterns from textual databases that can then be used to activate alerts, thus informing users, such as analysts, that a risk may or is about to materialize. In particular, the present invention is directed towards automatically mining risk from different sources, thereby allowing an analyst to review many more information sources than possible with techniques of the prior art.

In one aspect of the present invention a computer implemented method for mining risks is provided. The method includes providing a set of risk-indicating patterns on a computing device; querying a corpus using the computing device to identify a set of potential risks by using a risk-identification-algorithm based, at least in part, on the set of risk-indicating patterns associated with the corpus; comparing the set of potential risks with the risk-indicating patterns to obtain a set of prerequisite risks; generating a signal representative of the set of prerequisite risks; and storing the signal representative of the set of prerequisite risks in an electronic memory. Prior to this mining, a corpus of textual data is first searched with the computing device containing the risk-identification-algorithm for instances of a set of risk-indicative seed patterns provided to create a risk database, which is done by a risk miner function. The corpus may include any searchable source of information. Generally such sources are digital and accessible through computerized searching. For example, the corpus may include, but is not limited to, news, financial information, blogs, web pages, event streams, protocol files, status updates on social network services, emails, short message services, instant chat messages, Twitter tweets, and/or combinations thereof. Rather than alert a user after a risk factor has in fact occurred, a risk alerter function may pass warning notifications to a user directly, thereby avoiding the shortcomings of the prior art.

In another aspect of the present invention a computing device or system may include an electronic memory; and a risk-identification-algorithm based, at least in part, on the set of risk-indicating patterns associated with a corpus stored in the electronic memory.

These and other features of the invention will be more fully understood from the following description of specific embodiments of the invention taken together with the accompanying drawings. Like reference symbols in the various drawings indicate like elements.

BRIEF DESCRIPTION OF THE DRAWINGS

In the drawings:

FIGS. 6-13 are risk mining examples according to the present invention; and

DETAILED DESCRIPTION OF THE INVENTION

Figures 1, 2:
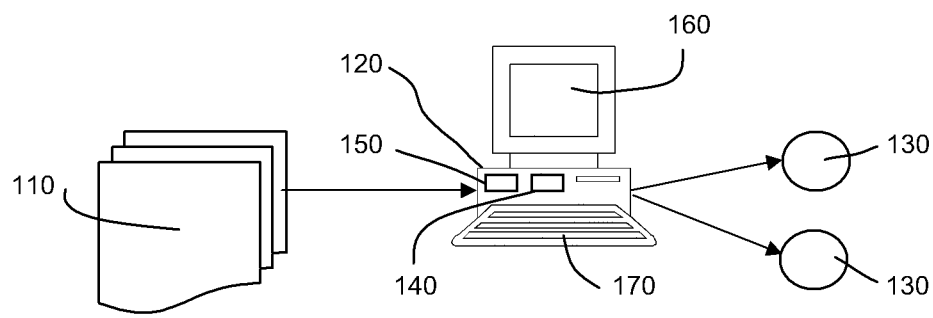
FIG. 1 is a depiction of a prerequisite of an event forming a risk according to the present invention.
FIG. 2 is a schematic of a device for mining risks according to the present invention.

FIG. 1 illustrates how a risk materializes over time. Initially, a Risk, P=>Q, is extracted from a large textual database at time $t_i$, where Q stands for a high-impact event and P stands for a prerequisite of Q which is causally or statistically connected to Q and precedes Q in time. The implication symbol "=>" captures the causality and/or enablement relation holding between P and Q (e.g., P causes Q, or P is likely to enable Q). The implication symbol "=>" is not meant to be a material implication. Later at time, $t_j$, P might happen, which in turn may lead to Q occurring at time $t_k$. The present invention solves the problem of obtaining risks P=>Q automatically from text and describes how a risk P=>Q and a prerequisite P may be used to alert a user that event Q may be imminent. As used herein, the term risk, which may be positive or negative, refers to an event involving uncertainty unless the event has occurred, which may result from a factor, thing, element, or course. In particular, as used herein, the term risk, which may be positive or negative, refers to a prerequisite for an event where the prerequisite is causally or statistically connected to the event and precedes the event in time. As used herein, the term prerequisite refers to a statement or an indication relating to a particular subject. In particular, the term prerequisite refers to statement or an indication relating to a particular event, either directly or thought the mining techniques of the present invention.

Figure 3:
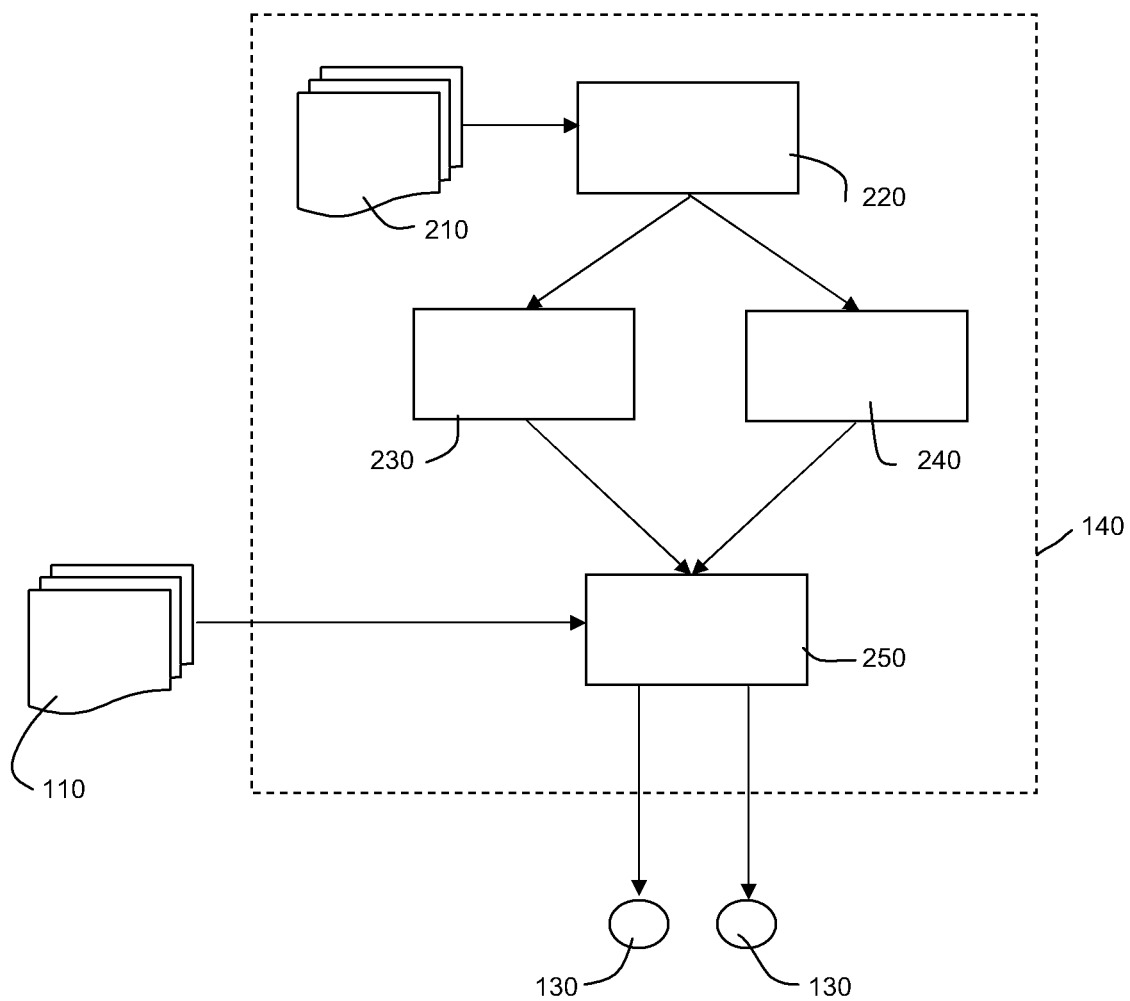
FIG. 3 is a schematic of the method for mining risks according to the present invention.
Figure 4:
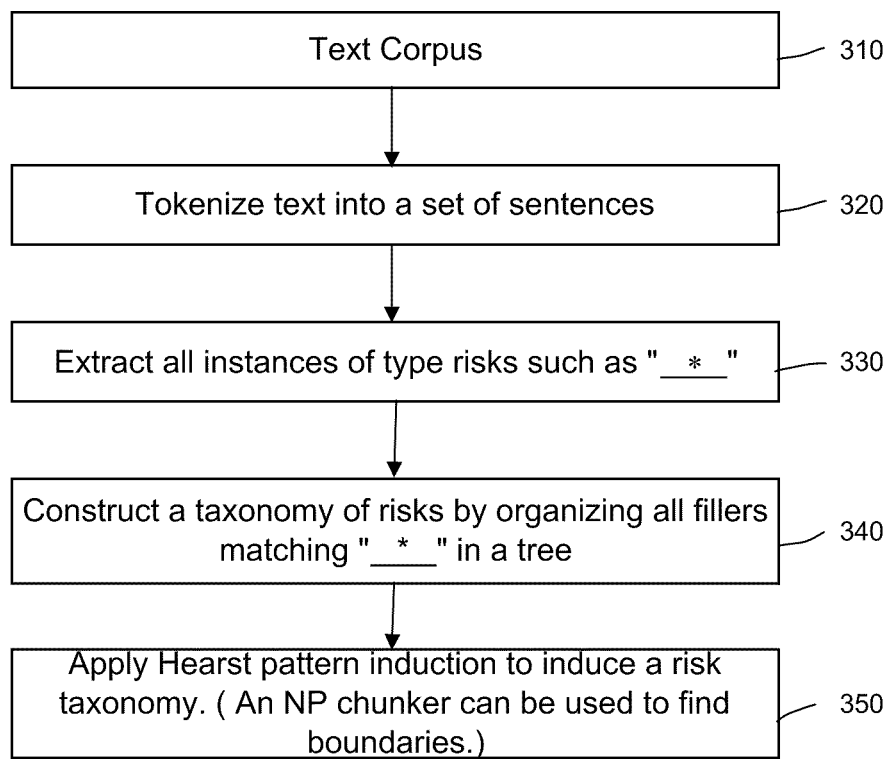
FIG. 4 depicts an embodiment of risk clustering according to the present invention.
Figure 5:
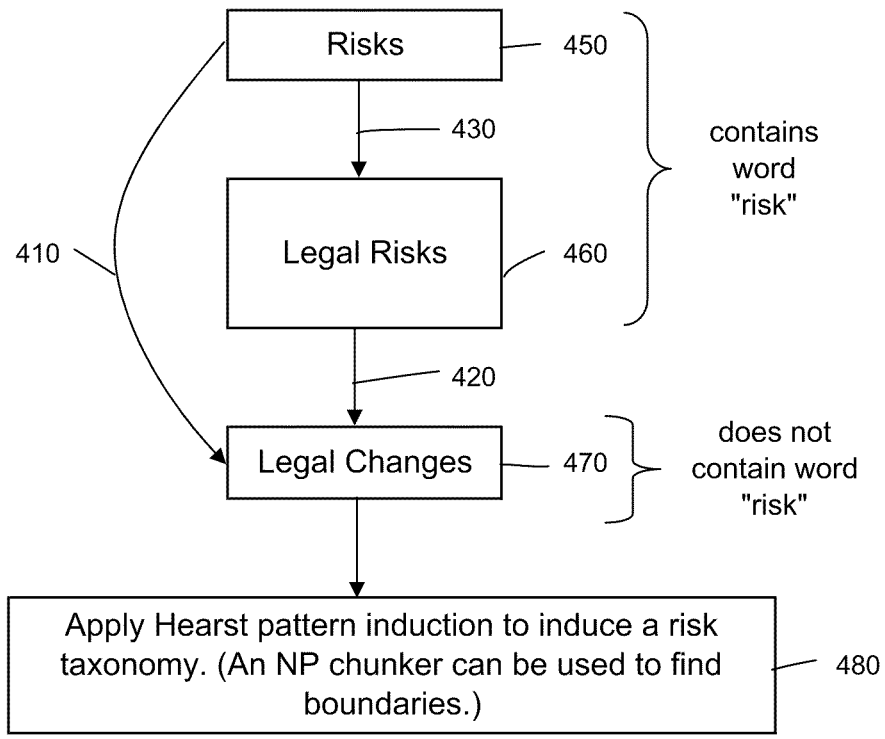
FIG. 5 another embodiment of risk clustering according to the present invention.

FIGS. 2 and 3 illustrate the overall process of the present invention. As depicted in FIG. 2, a corpus 110, for example a set(s) of textual feed(s), is mined for risk through use of a computing device 120. As used herein, the term corpus and it variants refer to a set or sets of data, in particular digital data including textual data. The corpus 110 may include, but is not limited to, news; financial information, including but not limited to stock price data and its standard derivation (volatility); governmental and regulatory reports, including but not limited, to government agency reports, regulatory filings such as tax filings, medical filings, legal filings, Food and Drug Administration (FDA) filings, Security and Exchange Commission (SEC) filings; private entity publications, including but not limited to, annual reports, newsletters, advertising and press releases; blogs; web pages; event streams; protocol files; status updates on social network services; emails; Short Message Services (SMS); instant chat messages; Twitter tweets; and/or combinations thereof. The computing device 120 surveys corpus 110 to extract risk-indicating patterns and to seed the risk-identification-algorithm 140 with risk-indicative seed patterns for subsequent risk mining by an analyst or user. The computing device 120 contains or includes the risk-identification-algorithm 140 and may further include an interface 170 for querying the computing device 120, such as a keyboard, and a display device 160 for displaying results from the computing device 120.

The computing device 120 may also be used to alert users 130 through a computer interface (not shown) of risks, including but not limited to imminent risks, i.e., risks that are likely to occur including, but not limited to, likely to occur in the near future or a defined time period. Typically, the users 130 are alerted via a computing device (not shown). The present invention, however, is not so limited, and any device having a visual display or even a voice communication may suitably be used. As used herein, the term "computing device" refers to a device that computes, especially a programmable electronic machine that performs high-speed mathematical or logical operations or that assembles, stores, correlates, or otherwise processes information. Examples include, without limitation, mainframe computers, personal computers and handheld devices. Before mining the corpus 110 for risk, the present invention utilizes the computing device 120 to extract risk-indicating patterns from corpus or corpora of textual data. As used herein, risk-indicating patterns are patterns developed through the techniques of the present invention which relate possible prerequisites to possible events.

As depicted in FIG. 3, the risk-identification-algorithm 140 of the computing device 120 includes a corpus 210, a risk miner 220, a risk type classifier 230, a risk clusterer 240 and a risk alerter 250, as described hereinbelow. The risk miner 220 searches the corpus 210 of textual data for instances of a set of risk-indicative seed patterns to create a risk database. The corpus 210 may include, but is not limited to, news; financial information, including but not limited to stock price data and its standard derivation (volatility); governmental and regulatory reports, including but not limited, to government agency reports, regulatory filings such as tax filings, medical filings, legal filings, Food and Drug Administration (FDA) filings, Security and Exchange Commission (SEC) filings; private entity publications, including but not limited to, annual reports, newsletters, advertising and press releases; blogs; web pages; event streams; protocol files; status updates on social network services; emails; Short Message Services (SMS); instant chat messages; Twitter tweets; and/or combinations thereof. The corpus 210 may be the same as corpus 110 or may be different.

In one embodiment of the invention, trigger keywords are used (e.g. "risk", "threat") to generate the risk database. In another embodiment, regular expressions are used (e.g. "("may")? pose(s)? (a)? threat(s)? to") to generate the risk database. Candidate risk sentences or sentence sequences are created, and new patterns are generalized by running a named entity tagger or Part of Speech (POS) tagger, and chunker (entities can be described by proper nouns or NPs, and not just given by named entities) over it, and by substituting entities by per-class placeholder (e.g. "J.P. Morgan"=>"<COMPANY>"). These generated patterns can be used for re-processing the corpus, in one embodiment of the present invention after some human review, or automatically in another embodiment. The extracted sentences or sentence sequences are then both validated (whether or not they are really risk-indicating sentences) and parsed into risks of the form P=>Q (i.e. finding out which text spans correspond to the precondition "P", which parts express the implication "=>", and which parts express the high-impact event "Q"), using, but not limited to, the following nonlimiting features:

- a set of terms with significant statistical association with the term "risk" (in one embodiment of this invention, statistical programs, such as Pointwise Mutual Information (PMI) and Log Likelihood, or rules, including but not limited to rules obtained by Hearst pattern induction, may be used to determine the set of terms);
- a set of binary gazetteer features, where the feature fires if a gazetteer a set of risk-indicative terms ("threat", "bankruptcy", "risk", . . . ) compiled by human experts or extracted from hand-labelled training data;
- a set of indicators of speculative language;
- instances of future time reference;
- occurrences of conditionals; and/or
- occurrences of causality markers.

In one embodiment of the present invention, a variant of surrogate machine-learning (i.e., technology for machine learning tasks by examples) may be used to create training data for a machine-learning based classifier that extracts risk-indicative sentences. One useful technique is described by Sriharsha Veeramachaneni and Ravi Kumar Kondadadi in "Surrogate Learning—From Feature Independence to Semi-Supervised Classification", Proceedings of the NAACL HLT Workshop on Semi-supervised Learning for Natural Language Processing, pages 10-18, Boulder, Colo., June 2009. Association for Computational Linguistics (ACL), the contents of which is incorporated herein by reference.

The risk type classifier 230 classifies each risk pattern by risk type ("RT"), according to a pre-defined taxonomy of risk types. In one embodiment of the present invention, this taxonomy may use, but not limited to, the following non-limiting classes:

Political: Government policy, public opinion, change in ideology, dogma, legislation, disorder (war, terrorism, riots);

Environmental: Contaminated land or pollution liability, nuisance (e.g. noise), permissions, public opinion, internal/corporate policy, environmental law or regulations or practice or 'impact' requirements;

Planning Permission requirements, policy and practice, land use, socio-economic impact, public opinion;

Market: Demand (forecasts), competition, obsolescence, customer satisfaction, fashion;

Economic: Treasury policy, taxation, cost inflation, interest rates, exchange rates;

Financial: Bankruptcy, margins, insurance, risk share;

Natural: Unforeseen ground conditions, weather, earthquake, fire, explosion, archaeological discovery;

Project: Definition, procurement strategy, performance requirements, standards, leadership, organization (maturity, commitment, competence and experience), planning and quality control, program, labor and resources, communications and culture;

Technical: Design adequacy, operational efficiency, reliability;

Regulatory: Changes by regulator;

Human: Error, incompetence, ignorance, tiredness, communication ability, culture, work in the dark or at night;

Criminal: Lack of security, vandalism, theft, fraud, corruption;

Safety: Regulations, hazardous substances, collisions, collapse, flooding, fire, explosion; and/or Legal: Changes in legislations, treaties.

The risk clusterer 240 groups all risks in the risk database by similarity, but without imposing a pre-defined taxonomy (data driven). In one embodiment Hearst pattern induction may be used. Hearst pattern induction was first mentioned in Hearst, Marti, "WordNet: An Electronic Lexical Database and Some of its Applications", (Christiane Fellbaum (Ed.)), MIT Press 1998, the contents of which is incorporated herein by reference. In another embodiment of the present invention a number k is chosen by the system developer, and the kNN-means clustering method may be used. Further details of kNN clustering is described by Hastie, Trevor, Robert Tibshirani and Jerome Friedman, "The Elements of Statistical Learning: Data Mining, Inference, and Prediction", Second Edition Springer (2009), the content of which is incorporated herein by reference. In such a case, the risks are grouped into a number, i.e. k, of categories and then classified by choosing the cluster with the highest similarity to a cluster of interest. In another embodiment of the present invention, hierarchical clustering is used. Alternatively or in addition to, both k-means clustering and hierarchical clustering may be used.

FIG. 4 depicts one embodiment of the risk clusterer 240 according to the present invention. At step 310, a text corpus is provided. At step 320, the text corpus is tokenized into a set of sentences. At step 330, all instances of a risk, which is indicated by "*", is extracted from the tokenized text. At step 340, a taxonomy of risks is constructed into a tree by organizing all fillers matching the risk, i.e. "*". At step, 350, Hearst pattern induction may be used to induce the risk taxonomy. Further, an NP chunker may be used to find the boundaries of interest.

FIG. 5 depicts another embodiment of the risk clusterer 240 according to the present invention. In this embodiment, a risk taxonomy is created from, for example risks 450, legal risks 460 and legal changes 470. Risks 450, such as those that may be associated with legal changes 470, are seeded, as indicated by 410. Legal risks 460, such as legal changes 470, are mined by the computing device 120, as indicated by 420. Risks 450 are also mined for legal risks 460, as indicated by 430. In such a manner there is feedback for the legal risks 460 based on the risks 450 and the legal changes 470. The mining of the risks 450 and the legal risks 460 may include mining with the word risk or an equivalent thereto. The mining of the legal changes 470 does not necessarily include the word risk. Advantageously, the taxonomy resulting from this process contains risk-indicative phrases that do not necessarily contain the word "risk" itself. Such taxonomy may be used in the risk-mining patterns in addition to their use for risk-type classification.

The risk alerter 250, as illustrated in FIG. 2, performs a similarity matching operation between the risks in the risk database and likely instances of P or Q in a textual feed 110. If evidence for P is found, the risk P=>Q is "imminent". If evidence for Q is found, the risk P=>Q has materialized. In one embodiment of the present invention, the risk alerter 250 passes warning notifications to a user 130 directly.

As a result, when inspecting the risk database, the user 130 (e.g. a risk analyst) can take immediate action before the risk materialises and increase the priority of the management of imminent risks ("P!, . . . , P!, P!, P!, . . . . P! . . . ") in the textual feed and materialized risks ("Q!") as events unfold, without having to even read the textual feeds.

In one embodiment of the present invention, the output of the risk alerter 250 is connected to the input of a risk routing unit (not shown in FIGS. 2-3), which notifies an analyst whose profile matches the risk type RT. For example, an analyst may want to know about environmental risks. The risk alerter 250 would alert the analyst about an environmental risk when a prerequisite of a possible environmental event is mined. For example, the analyst may be alerted to an environmental risk of global warming when industrial activity increases in a particular country or region.

In one embodiment of the present invention, a set of risk descriptions as extracted from the corpus defined as the set of all past Security Exchange Commission ("SEC") filings, is matched to the risks extracted from the textual feed. The method proposes one risk description or a ranked list of alternative risk descriptions for inclusion in draft SEC filings for the company operating the system, in order to ensure compliance with SEC business risk disclosure duties.

The present invention may use a variety of methods for risk identification. For example, as depicted in FIG. 6, risk mining may include baseline monitoring of regular patterns over surface strings and named entity tags; identification of words frequently associated with risk using clustering information theory; and/or risk-indicative sentence clustering. Alternatively or in addition to, technology for machine learning of tasks by example may be used. The risk identification includes the querying of a corpus or corpora for risk indicating patterns. The query result may match all, substantially all or some of the risk indicating patterns. The number of occurrences or particular risk indicating patterns may also be used in the risk mining techniques of the present invention.

FIGS. 7 and 8 illustrate examples of risk mining according to the present invention. In Example 1 of FIG. 7, the corpus, including the listed news article, is mined for the term "cholesterol" as P or a prerequisite of Q or an event. The event Q is further classified by a holder "diabetics" and a target "amputation risk". The Risk Type RT is health and has a positive polarity as being beneficial to health. For purposes of the present invention, the term risk not only refers to negative or harmful events, but also may refer to positive or beneficial results. In other words, a risk may have a positive impact and/or a negative impact. In Example 2 of FIG. 8, the corpus, including the listed news article, is mined for the phrase "North Korea launch" as P or a prerequisite of Q or an event. The event Q is further classified by a holder "North Korea" and a target "more than condemnation: U.S.". The Risk Type RT is political and has a negative polarity as being harmful to world politics. Moreover, such negative and/or positive polarities may also be weighted for degree of the risk. In such a case it may be beneficial to alert the user 130 to a very harmful or very beneficial risk to a greater degree than for a less consequential risk.

FIG. 9 illustrates another example of risk mining according to the present invention. In Example 3, the news article is mined. As background, demand for the metal lithium is increasing with limited supplies being available. Much of the metal is obtained from Bolivia, which at the time of this article has a government which may be viewed by some not to be friendly to capitalistic governments or businesses. The article is mined for a variety of potential words, sequences of words, and/or partial phrases to query the article for prerequisite P of events Q which may lead to risk, as indicated by the underlined words and/or sequences. The risk types present in the article include supply-demand risk and political risk.

FIG. 10 illustrates another example of risk mining according to the present invention. In Example 4, a corpus is mined for a pattern having specific tokens, i.e., "if" and "then". The mining extracts sequences beginning with or having these tokens. The length of the sequence is not limited to any particular length or number of words, but is determined by tokens. The sequences are stored in registers, for example in the computing device 120. The use of patterns, however, such as, but not limited to those shown in FIG. 13, may be more precise than using a keyword-based ranked retrieval.

FIG. 11 illustrates another example of risk mining according to the present invention. In Example 5, a corpus is mined according to the syntax or the grammatical structure of sentences or phrases. In this example, normal PENN Treebank classes or tags or slightly modified PENN tags are used. Further details of Penn Treebank may be found at http://www.cis.upenn.edu/~treebank/(PENN Treebank homepage), the contents of which is incorporated herein by reference, or by contacting Linguistic Data Consortium, University of Pennsylvania, 3600 Market Street, Suite 810, Philadelphia, Pa. 18104. For languages other than English, corresponding tagsets have been established and are known to one of ordinary skill in the art. In this example, the tag "PRP" refers to a personal pronoun, i.e., "we" in the example sentence. The tag "VBP" refers a non-third person singular present tense verb, i.e. "expect" in the example sentence. The tag "TO" simply refers to the word "to" in the example sentence. The "VB" tag refers to a base form verb, i.e. "be" in the example sentence. The "RB" tag refers to an adverb, i.e., "negatively" in the example sentence. The "IN" tag refers to a preposition or subordinating conjunction, i.e. "by" in the example sentence. Some of the common PENN Treebank word P.O.S. tags include, but are not limited to, CC—Coordinating conjunction; CD—Cardinal number; DT—Determiner; EX—Existential there; FW—Foreign word; IN—Preposition or subordinating conjunction; JJ—Adjective; JJR—Adjective, comparative; JJS—Adjective, superlative; LS—List item marker; MD—Modal; NN—Noun, singular or mass; NNS—Noun, plural; NNP—Proper noun, singular; NNPS—Proper noun, plural; PDT—Predeterminer; POS—Possessive ending; PRP—Personal pronoun; PRP$—Possessive pronoun (prolog version PRP-S); RB—Adverb; RBR—Adverb, comparative; RBS—Adverb, superlative; RP—Particle; SYM—Symbol; TO—to; UH—Interjection; VB—Verb, base form; VBD—Verb, past tense; VBG—Verb, gerund or present participle; VBN—Verb, past participle; VBP—Verb, non-3rd person singular present; VBZ—Verb, 3rd person singular present; WDT—Wh-determiner; WP—Wh-pronoun; WP$—Possessive wh-pronoun (prolog version WP-S); and WRB—Wh-adverb.

In FIG. 12, Example 6 illustrates another mining sequence or algorithm based on PENN treebank tags. Thus, as shown in FIGS. 11 and 12, the mining techniques of the present invention may analyze the same sentence under different criteria to obtain risks or prerequisites for risks.

In FIG. 13, risk mining according to the present invention is accomplished by a sequence of binary grammatical dependency relationships between words, including placeholders.

The above-described examples and techniques for mining risks may be used individually or in any combination. The present invention, however, is not limited to these specific examples and other patterns or techniques may be used with the present invention. The mined patterns from these examples and/or from the techniques of the present invention may be ranked according to ranking algorithms, such as, but not limited to statistical language models (LMs), graph-based algorithms (such as PageRank or HITS), ranking SVMs, or other suitable methods.

In one aspect of the present invention, a computer implemented method for mining risks is provided. The method includes providing a set of risk-indicating patterns on a computing device 120; querying a corpus 110 using the computing device 120 to identify a set of potential risks by using a risk-identification-algorithm 140 based, at least in part, on the set of risk-indicating patterns associated with the corpus 110; comparing the set of potential risks with the risk-indicating patterns to obtain a set of prerequisite risks; generating a signal representative of the set of prerequisite risks; and storing the signal representative of the set of prerequisite risks in an electronic memory 150. The method may further include determining an imminent risk from the prerequisite risks, the imminent risk being determined using the risk-identification-algorithm 140, the imminent risk being associated with at least one risk from the set of prerequisite risks; generating a signal representative of the imminent risk; and storing the signal representative of the imminent risk in the electronic memory 150. Still further, the method may further include, after storing the signal representative of the set of prerequisite risks, determining a materialized risk, the materialized risk being determined using the risk-identification-algorithm 140, the materialized risk being associated with the set of risks; generating a signal representative of the materialized risk; and storing the signal representative of the materialized risk in the electronic memory 150. Moreover, the method may still further include, after storing the signal representative of the imminent risk, determining a materialized risk, the materialized risk being determined using the risk-identification-algorithm 140, the materialized risk being associated with the imminent risk; generating a signal representative of the materialized risk; and storing the signal representative of the materialized risk in the electronic memory 150.

Desirably, the corpus 110 is digital. The corpus 110 may include, but is not limited to, news; financial information, including but not limited to stock price data and its standard derivation (volatility); governmental and regulatory reports, including but not limited, to government agency reports, regulatory filings such as tax filings, medical filings, legal filings, Food and Drug Administration (FDA) filings, Security and Exchange Commission (SEC) filings; private entity publications, including but not limited to, annual reports, newsletters, advertising and press releases; blogs; web pages; event streams; protocol files; status updates on social network services; emails; Short Message Services (SMS); instant chat messages; Twitter tweets; and/or combinations thereof.

The risk-identification-algorithm 140 may be based upon various factors and/or criteria. For example, the risk-identification-algorithm 140 may be based upon, but not limited to, a set of terms statistically associated with risk; upon a temporal factor; upon a set of customized criteria, etc. and combinations thereof. The set of customized criteria may include and/or take into account of, for example, an industry criterion, a geographic criterion, a monetary criterion, a political criterion, a severity criterion, an urgency criterion, a subject matter criterion, a topic criterion, a set of named entities, and combinations thereof.

In one aspect of the present invention, the risk-identification-algorithm 140 may be based upon a set of source ratings. As used herein, the phrase "source ratings" refers to the rating of sources, for example, but not limited to, relevance and reliability. The set of source ratings may have a one to one correspondence with a set of sources. The set of sources may serve as a source of information on which the corpus 110, 210 is based. The set of source ratings may be modified based upon an imminent risk, a materialized risk, and combinations thereof.

The method of the present invention may further include transmitting the signal representative of the set of prerequisite risks, transmitting the signal representative of the imminent risk, transmitting the signal representative of the materialized risk, and combinations thereof. Moreover, the present invention may further include providing a web-based risk alerting service using at least one of the signal representative of the set of risks, the signal representative of the imminent risk, the signal representative of the materialized risk, and combinations thereof.

In another aspect of the present invention a computing device 120, as depicted in FIG. 2, may include an electronic memory 150; and a risk-identification-algorithm 140 based, at least in part, on the set of risk-indicating patterns associated with a corpus stored in the electronic memory 150. A processor (not shown) may be used to run the algorithm 140 on the computing device 120. The computing device 120 may include a computer interface 170, which is depicted, but not limited to, a keyboard, for querying the risk-identification-algorithm 140. The computing device 120 may include a display device 160 for receiving a signal from the electronic memory 150 and for displaying risk alerts from the risk-identification-algorithm 140.

Figure 14:
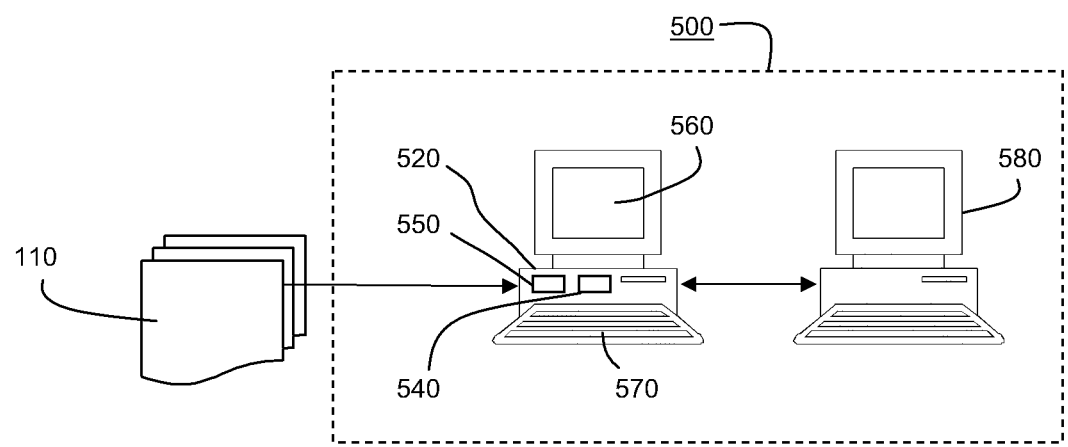
FIG. 14 is a schematic of the system for mining and alerting risks according to the present invention.

In another aspect of the present invention, a computer system 500, as depicted in FIG. 14, is provided for alerting a user of risks. The system 500 may include a computing device 520 having an electronic memory 550 and a risk-identification-algorithm 540 based, at least in part, on the set of risk-indicating patterns associated with a corpus 110 stored in the electronic memory 550. A processor (not shown) may be used to run the algorithm 540 on the computing device 520. The system 500 may further include a user interface device 580 for querying the risk-identification-algorithm 540 and for receiving a signal from the electronic memory 550 of the computing device 520 for alerting a user of risks. The user interface device 580 may include, but is not limited to, a computer, a television, a portable media device, and/or a web-enabled device, such as a cellular phone, a personal data assistant, and the like.

While the invention has been described by reference to certain preferred embodiments, it should be understood that numerous changes could be made within the spirit and scope of the inventive concept described. Accordingly, it is intended that the invention not be limited to the disclosed embodiments, but that it have the full scope permitted by the language of the following claims.

What is claimed is:

1. A computer-implemented method of machine-learning based natural language processing for risk mining in an electronic document corpus, the method comprising:
   generating, using a computing device, a set of training data comprising a set of risk-indicating patterns from a set of example data by applying at least one machine-learning process by a machine-learning based classifier that extracts risk-indicative sentences, the generating further comprising:
      deriving the set of risk-indicating patterns in part by extracting a set of candidate sentence sequences by a tagger and a chunker;
      validating the extracted set of candidate sentence sequences; and parsing the validated, extracted set of candidate sentence sequences into risks of the form P=>Q;
   accessing, using a computing device, a database that includes the set of risk-indicating patterns generated by the at least one machine-learning process, each of the set of risk-indicating patterns including at least a first prerequisite associated with an event, and precedes the event in time;
   processing, using a risk-identification-algorithm based at least in part on the set of risk-indicating patterns generated by the at least one machine-learning process, a corpus of textual data to identify a set of risks associated with legal changes, the risk-identification-algorithm comprising at least a risk miner, the risk miner searches the corpus of textual data for instances of the risk-indicating patterns generated by the at least one machine-learning process and associated with the corpus to create the set of risks associated with legal changes;
   clustering by a risk clusterer the set of risks associated with legal changes, the clustering comprising grouping the set of risks associated with legal changes into one or more categories and clustering the grouped set of risks associated with legal changes, further comprising using the chunker to identify boundaries of interest of the grouped set of risks;
   constructing, based on the clustering and at least one taxonomy inducing function, a taxonomy of risks, wherein the at least one taxonomy inducing function includes applying a Hearst pattern induction to induce the taxonomy of risks;
   comparing the clustered set of risks associated with legal changes with the risk-indicating patterns generated by the at least one machine-learning process to obtain a set of prerequisites for identified risk-based events that has not occurred from the set of risks based on a class type and a polarity wherein the comparing is based on the constructed taxonomy of risks, the class type indicating a risk class associated with the risk-indicating patterns generated by the at least one machine-learning process, the polarity indicating one of benefit and detriment associated with the class type, the polarity being weighted to either increase the risk class in order to reduce the detriment associated with the class type or reduce the risk class in order to increase the benefit associated with the class type;

routing a warning notification to a device associated with a first user whose profile matches the class type, the warning notification alerting the first user with respect to an identified set of prerequisites for identified risk-based events, the warning notification being generated based on at least a first risk-based event unforeseeable to the first user, the notification being transmitted prior to the actual occurrence of the first identified risk-based event; and transmitting, using a risk routing unit, a priority notification to a second user indicating priority of management of the at least one identified risk-based event and a materialized event, the priority notification being based on the warning notification generated to the first user, the priority notification thereby minimizing delay in priority of an action by the second user based on at least the first identified risk-based event.

2. The method of claim 1, further comprising:
determining an imminent risk using the risk-identification algorithm that indicates a potential future event based on at least one second prerequisite in a set of second prerequisites;
generating a signal representative of the imminent risk; and
storing the signal representative of the imminent risk in an electronic memory.

3. The method of claim 1, further comprising:
determining a materialized risk using the risk-identification algorithm that indicates an event that occurred based on at least one prerequisite in the set of prerequisites;
generating a signal representative of the materialized risk; and
storing the signal representative of the materialized risk in an electronic memory.

4. The method of claim 2, further comprising:
determining using the risk-identification algorithm that the potential future event has occurred based on at least one prerequisite in the set of prerequisites;
generating a signal representative of the event that occurred; and
storing the signal representative of the event that occurred in the electronic memory.

5. The method of claim 1, wherein the corpus is digital.

6. The method of claim 5, wherein the corpus comprises one or more of news, financial information, blogs, event streams, protocol files, social network services, emails, short message Service (SMS), instant chat messages, social network posts, and legal information.

7. The method of claim 1, wherein the risk-identification algorithm is based upon a set of terms statistically associated with risk.

8. The method of claim 1, wherein the risk-identification algorithm is based upon a temporal factor.

9. The method of claim 1, wherein the risk-identification algorithm is based upon a set of customized criteria.

10. The method of claim 9, wherein the set of customized criteria comprises one or more of an industry criterion, a geographic criterion, a monetary criterion, a political criterion, a severity criterion, an urgency criterion, a topic criterion, and a set of named entities.

11. The method of claim 4, wherein the risk-identification algorithm is based upon a set of source ratings, the set of source ratings having a one to one correspondence with a set of sources, the set of sources serving as a source of information on which the corpus is based.

12. The method of claim 11, further comprising modifying the set of source ratings based upon the imminent risk.

13. The method of claim 11, further comprising modifying the set of source ratings based upon the materialized risk.

14. The method of claim 1, further comprising transmitting the signal representative of the set of prerequisite risks.

15. The method of claim 2, further comprising transmitting the signal representative of the imminent risk.

16. The method of claim 4, further comprising transmitting the signal representative of the materialized risk.

17. The method of claim 4, further comprising providing a web-based risk alerting service using at least one of the signal representative of the set of risks, the signal representative of the imminent risk, and the signal representative of the materialized risk.

18. The method of claim 1, wherein the set of risk-indicating patterns is obtained from past Security Exchange Commission (SEC) filings.

19. A computing device for machine-learning based natural language process for mining risks from an electronic document corpus, the computing device comprising:
an electronic memory storing a corpus of textual data and a database that includes a set of risk-indicating patterns, each of the set of risk-indicating patterns associating a prerequisite with an event, the prerequisite preceding the event in time;
a processor configured to:
generate, by applying at least one machine-learning process to a set of example data by a machine-learning based classifier that extracts risk-indicative sentences, a set of training data comprising the set of risk-indicating patterns, the generating further comprising:
deriving the set of risk indicating patterns in part by extracting a set of candidate sentence sequences by a tagger and a chunker;
validating the extracted set of candidate sentence sequences; and
parsing the validated, extracted set of candidate sentence sequences into risks of form P=>Q;
process, using a risk-identification-algorithm based at least in part on the set of risk-indicating patterns generated by the at least one machine-learning process, the corpus of textual data to identify a set of risks associated with legal changes, the risk-identification-algorithm comprising at least a risk miner, the risk miner searches the corpus of textual data for instances of the risk-indicating patterns generated by the at least one machine-learning process and associated with the corpus to create the set of risks associated with legal changes;
clustering by a risk clusterer the set of risks associated with legal changes, the clustering comprising grouping the set of risks associated with legal changes into one or more categories and clustering the grouped set of risks associated with legal changes, further comprising using the chunker to identify boundaries of interest of the grouped set of risks;
constructing, based on the clustering and at least one taxonomy inducing function, a taxonomy of risks, wherein the at least one taxonomy inducing function includes applying a Hearst pattern induction to induce the taxonomy of risks;

compare, using the risk miner the clustered set of risks associated with legal changes with the set of risk-indicating patterns generated by the at least one machine-learning process to obtain a set of prerequisites for identified risk-based events that has not occurred from the set of risks based on a class type and a polarity wherein the comparing is based on the constructed taxonomy of risks, the class type indicating a risk class associated with the risk indicating patterns generated by the at least one machine-learning process, the polarity indicating one of benefit and detriment associated with the class type, the polarity being weighted to either increase the risk class in order to reduce the detriment associated with the class type or reduce the risk class in order to increase the benefit associated with the class type;

transmit, using the risk alerter a warning notification to a device associated with a first user whose profile matches the class type, the warning notification alerting the first user with respect to an identified set of prerequisites for identified risk-based events, the warning notification being generated based on at least a first identified risk-based event unforeseeable to the first user, the notification being transmitted prior to the actual occurrence of the first identified risk-based event; and transmit, by a risk routing unit coupled to the risk alerter, a priority notification to a second user indicating priority of management of the at least one identified risk-based event and a materialized event, the priority notification being based on the warning notification generated to the first user, the priority notification thereby minimizing delay in priority of an action by the second user based on the at least one identified risk-based event.

20. The computing device of claim 19, further comprising a computer interface to query the risk-identification-algorithm.

21. The computing device of claim 19, further comprising a display to receive a signal from the electronic memory and to display risk alerts from the risk-identification algorithm.

22. A computer-implemented system for machine-learning based natural language processing and risk mining in an electronic document corpus, the system comprising:
a computing device comprising:
an electronic memory storing a corpus of textual data and a database that includes a set of risk-indicating patterns, each of the set of risk-indicating patterns including a first prerequisite in association with an event, the prerequisite preceding the event in time; and a processor configured to:
generate, by applying at least one machine-learning process to a set of example data by a machine-learning based classifier that extracts risk-indicative sentences, a set of training data comprising the set of risk-indicating patterns, the generating further comprising:
deriving the set of risk-indicating patterns in part by extracting a set of candidate sentence sequences by a tagger and a chunker;
validating the extracted set of candidate sentence sequences; and
parsing the validated, extracted set of candidate sentence sequences into risks of the form P=>Q;
process, using a risk-identification-algorithm based at least in part on the set of risk-indicating patterns generated by the at least one machine-learning process, a corpus of textual data to identify a set of risks associated with legal changes, the risk-identification-algorithm comprising at least a risk miner, the risk miner searches the corpus of textual data for instances of the risk-indicating patterns generated by the at least one machine-learning process and associated with the corpus to create the set of risks associated with legal changes;

clustering by a risk clusterer the set of risks associated with legal changes, the clustering comprising grouping the set of risks associated with legal changes into one or more categories and clustering the grouped set of risks associated with legal changes, further comprising using the chunker to identify boundaries of interest of the grouped set of risks;

constructing, based on the clustering and at least one taxonomy inducing function, a taxonomy of risks, wherein the at least one taxonomy inducing function includes applying a Hearst pattern induction to induce the taxonomy of risks;

compare, using the risk miner the clustered set of risks associated with legal changes with the risk-indicating patterns generated by the at least one machine-learning process to obtain a set of prerequisites for identified risk-based events that has not occurred from the set of risks based on a class type and a polarity wherein the comparing is based on the constructed taxonomy of risks, the class type indicating a risk class associated with the risk indicating patterns generated by the at least one machine-learning process, the polarity being weighted to indicate one of benefit and detriment associated with the class type;

transmit, using the risk alerter a warning notification to a device associated with a first user whose profile matches the class type, the warning notification alerting the first user with respect to an identified set of prerequisites for identified risk-based events, the warning notification being generated based on at least a first identified risk-based event unforeseeable to a first user, the notification being transmitted prior to the actual occurrence of the first identified risk-based event;

transmit, by a risk routing unit coupled to the risk alerter, a priority notification to a second user indicating priority of management of the at least one identified risk-based event and a materialized event, the priority notification being based on the warning notification generated to the first user, the priority notification thereby minimizing delay in priority of an action by the second user based on the at least one identified risk-based event; and a user interface device configured to query-the risk-identification-algorithm and receive a signal from the electronic memory of the computing device to alert at least one of the user and the second user based on at least a first identified risk-based event.

23. The method of claim 5, wherein the corpus comprises legal information.

24. The method of claim 23, wherein the legal information includes bankruptcy and default filings.

25. The method of claim 1, further comprising: generating a signal representative of the set of prerequisites; and
storing the signal representative of the set of prerequisites in an electronic memory.

26. The computing device of claim 19, wherein the processor is further configured to:
    generate a signal representative of the set of prerequisites; and
    store the signal representative of the set of prerequisites in the electronic memory.

27. The risk mining system of claim 22, wherein the processor is further configured to:
    generate a signal representative of the set of prerequisites; and
    store the signal representative of the set of prerequisites in the electronic memory.

* * * * *